(12) United States Patent
Sandfort et al.

(10) Patent No.: US 7,190,471 B2
(45) Date of Patent: Mar. 13, 2007

(54) FACILITATING PRINTING TO A LOCAL PRINTING DEVICE FROM A PORTABLE COMPUTING DEVICE

(75) Inventors: Patrick O. Sandfort, Meridian, ID (US); Gregory E. Perkins, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 939 days.

(21) Appl. No.: 10/143,672

(22) Filed: May 10, 2002

(65) Prior Publication Data
US 2003/0210424 A1 Nov. 13, 2003

(51) Int. Cl.
*G06K 15/00* (2006.01)

(52) U.S. Cl. ................... 358/1.14; 358/1.15

(58) Field of Classification Search .......... 358/1.15, 358/435, 1.14, 468; 455/557, 41, 405, 500, 455/517; 379/100.01, 400; 709/225
See application file for complete search history.

(56) References Cited

U.S. PATENT DOCUMENTS

| 5,845,076 | A  | * | 12/1998 | Arakawa ............... 709/203 |
|-----------|----|---|---------|--------------------------------|
| 6,233,058 | B1 | * | 5/2001  | Park ..................... 358/1.15 |
| 6,559,965 | B1 |   | 5/2003  | Simpson et al. |
| 6,574,678 | B1 | * | 6/2003  | Nykanen et al. ............ 710/10 |
| 6,744,528 | B2 | * | 6/2004  | Picoult et al. ............. 358/1.15 |
| 6,751,732 | B2 | * | 6/2004  | Strobel et al. ............. 713/176 |
| 6,801,962 | B2 | * | 10/2004 | Taniguchi et al. ........... 710/33 |
| 6,873,610 | B1 | * | 3/2005  | Noever ..................... 370/338 |
| 6,922,258 | B2 | * | 7/2005  | Pineau ...................... 358/1.15 |
| 6,980,319 | B2 | * | 12/2005 | Ohta ........................ 358/1.18 |
| 7,016,062 | B2 | * | 3/2006  | Ishizuka .................... 358/1.15 |
| 2001/0043273 | A1 | * | 11/2001 | Herrod et al. .............. 348/220 |
| 2002/0067504 | A1 | * | 6/2002 | Salgado et al. ............ 358/1.15 |
| 2002/0113998 | A1 | * | 8/2002 | Fujinawa .................. 358/1.15 |
| 2002/0178941 | A1 | * | 12/2002 | Mahoney et al. ............. 101/70 |
| 2002/0184318 | A1 | * | 12/2002 | Pineau ..................... 709/206 |
| 2003/0002072 | A1 | * | 1/2003 | Berkema et al. ........... 358/1.15 |
| 2003/0002073 | A1 | * | 1/2003 | Berkema et al. ........... 358/1.15 |
| 2003/0003957 | A1 | * | 1/2003 | Berkema et al. ........... 455/557 |
| 2003/0033408 | A1 | * | 2/2003 | Clough et al. ............. 709/225 |
| 2003/0051011 | A1 | * | 3/2003 | Schacht et al. ............ 709/221 |
| 2003/0083011 | A1 | * | 5/2003 | Haller et al. ................. 455/41 |
| 2003/0088828 | A1 | * | 5/2003 | Ackaret ..................... 715/505 |
| 2003/0162556 | A1 | * | 8/2003 | Libes ........................ 455/507 |
| 2003/0197887 | A1 | * | 10/2003 | Shenoy et al. ............. 358/1.15 |
| 2003/0200289 | A1 | * | 10/2003 | Kemp et al. ................. 709/221 |
| 2004/0039647 | A1 | * | 2/2004 | Roche ........................ 705/26 |
| 2005/0094184 | A1 | * | 5/2005 | Suyehira .................... 358/1.14 |
| 2005/0213152 | A1 | * | 9/2005 | Suzuki et al. .............. 358/1.15 |

FOREIGN PATENT DOCUMENTS

| DE | 10024715 |   | 5/2003 |
|----|----------|---|--------|
| EP | 1271895  | * | 1/2003 |
| WO | WO99/38068 |   | 7/1999 |

* cited by examiner

Primary Examiner—Jerome Grant (57) ABSTRACT

The present disclosure relates to a system and method for facilitating printing to a local printing device. In one arrangement, the system and method pertain to directly communicating with the local printing device, and obtaining identification information regarding the printing device including a network address of the printing device as a result of the communication with the local printing device so that a print path can be established with the printing device via a network.

26 Claims, 8 Drawing Sheets

FACILITATING PRINTING TO A LOCAL PRINTING DEVICE FROM A PORTABLE COMPUTING DEVICE

FIELD OF THE INVENTION

The present disclosure relates to printing data. More particularly, the disclosure relates to a system and method with which local printing devices can be printed to using a portable computing device.

BACKGROUND OF THE INVENTION

Currently, many persons travel from place to place with portable computing devices that are capable of establishing network connections. For instance, many people carry notebook computers and/or personal digital assistants (PDAs) along with them outside of their homes or offices.

Occasionally, such persons wish to print data from their portable computing devices to printing devices they encounter as they move from place to place. For example, an employee of a given company may wish to print a document to a printer in a conference room in which the employee is attending a meeting. Alternatively, a businessperson may wish to print to a given printer made available in a hotel or airport.

Although such printing may be feasible where the portable computing device is capable of establishing a connection with a network to which the printing device is connected, various impediments to use of the printing device may exist. As a first matter, the user must normally have the network address of the printing device to establish a print path to the printing device. Without such information, the user may need to rely upon trial and error in selecting the correct printing device. Although this may not be difficult where few printing devices are connected to a given network, it would be inefficient to rely on trial and error where a multiplicity of such devices are connected to the network.

In addition to needing a network address, various software may need to be installed on the user's computing device in order to be able to use the printing device. For example, driver software and various applications that are used to control or configure the printing device may be necessary. As is known in the art, software is typically needed to translate and send jobs from a given user application to the printing device. Therefore, even if the user can determine the correct network address for the desired printing device, the user may not be able to use the printing device without first installing the necessary software. This task may require locating a network administrator who knows the location of the software and how to properly install it.

From the above, it can be appreciated that it would be desirable to have a system and method that facilitates printing to a local printing device from a portable computing device in situations in which a print path has not previously been established for that printing device.

SUMMARY OF THE INVENTION

The present disclosure relates to a system and method for facilitating printing to a local printing device. In one arrangement, the system and method pertain to directly communicating with the local printing device, and obtaining identification information regarding the printing device including a network address of the printing device as a result of the communication with the local printing device so that a print path can be established with the printing device via a network.

In some embodiments, client identification information is provided to the printing device through the communications and, in turn, is provided by the printing device to a printing service that a client can access to obtain the printing device identification information. In other embodiments, the printing device identification information is obtained directly from the printing device through the communications.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
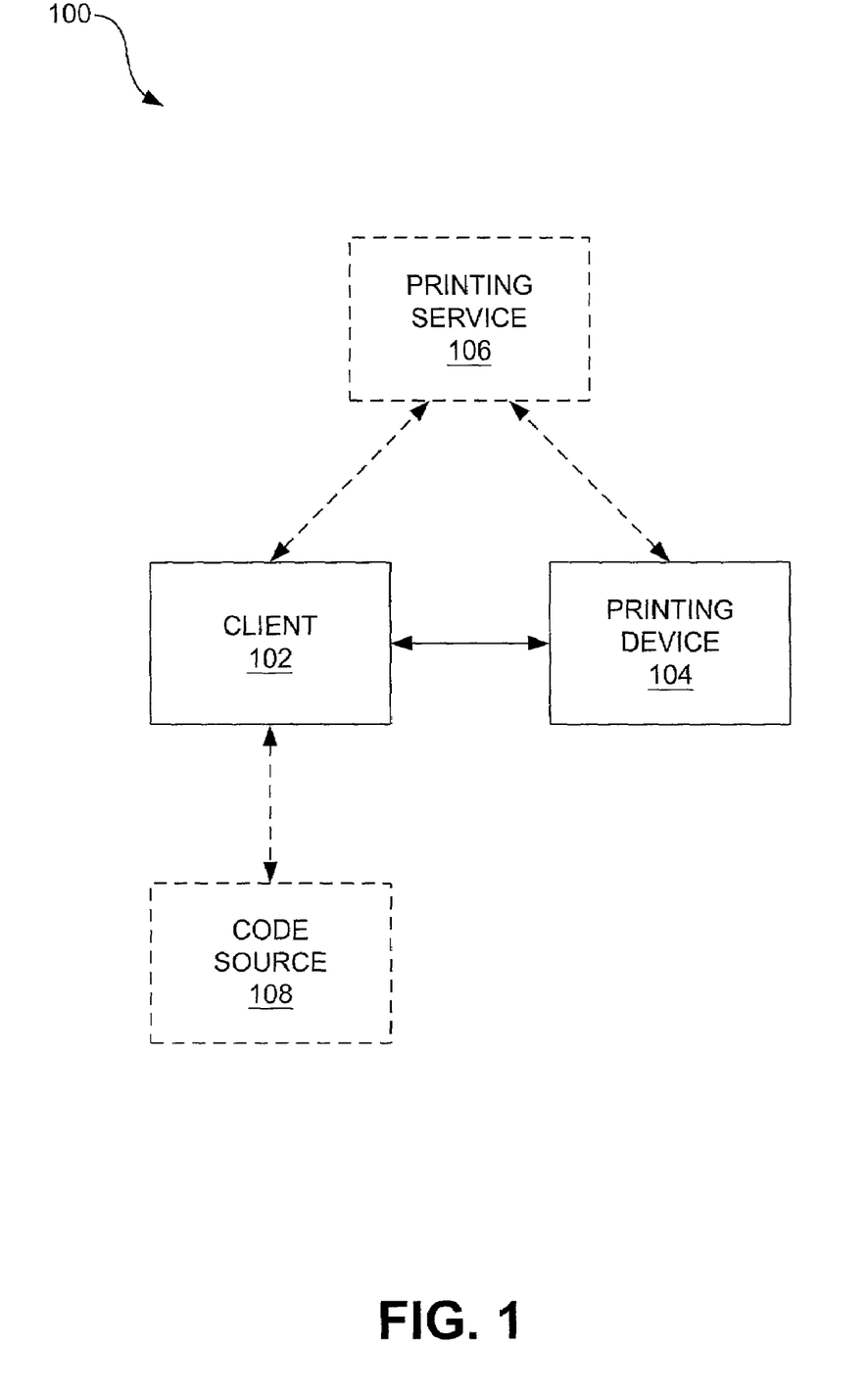
FIG. 1 is a block diagram of an example system that facilitates printing to a local printing device.

Referring now in more detail to the drawings, in which like numerals indicate corresponding parts throughout the several views, FIG. 1 illustrates a generalized system 100 for facilitating printing to a local printing device. As indicated in this figure, the system 100 generally comprises a client 102 and a printing device 104 to which the client would like to print. The client 102 can comprise a user as well as a client device that typically comprises a portable computing device such as a notebook computer, personal digital assistant (PDA), or other such computing device. As is discussed in greater detail below, the printing device 104 can communicate with the client 102. These communications can be direct communications facilitated by a variety of different communication technologies (e.g., radio frequency, infrared) and/or indirect communications facilitated by an appropriate network to which the client device and printing device 104 are connected.

As is further indicated in FIG. 1, the system 100 can, in some embodiments, comprise a printing service 106 that is configured to facilitate the printing process. By way of example, the printing service can receive information regarding the client 102 and the printing device 104 and provide the client with an appropriate address for the printing device so that a print path can be established with the printing device. In addition, the system 100 can, in some embodiments, also include a code source 108 that can be used by the client 102 as a source for various code (e.g., driver software) needed to send print jobs to the printing device 104.

With the arrangement summarized above, the client 102 can obtain the information it needs to access and use the printing device 104. Accordingly, with the system 100, a mobile user can print to substantially any printing device 104 the user encounters, even though the user had not previously established a print path to the printing device.

Figure 2:
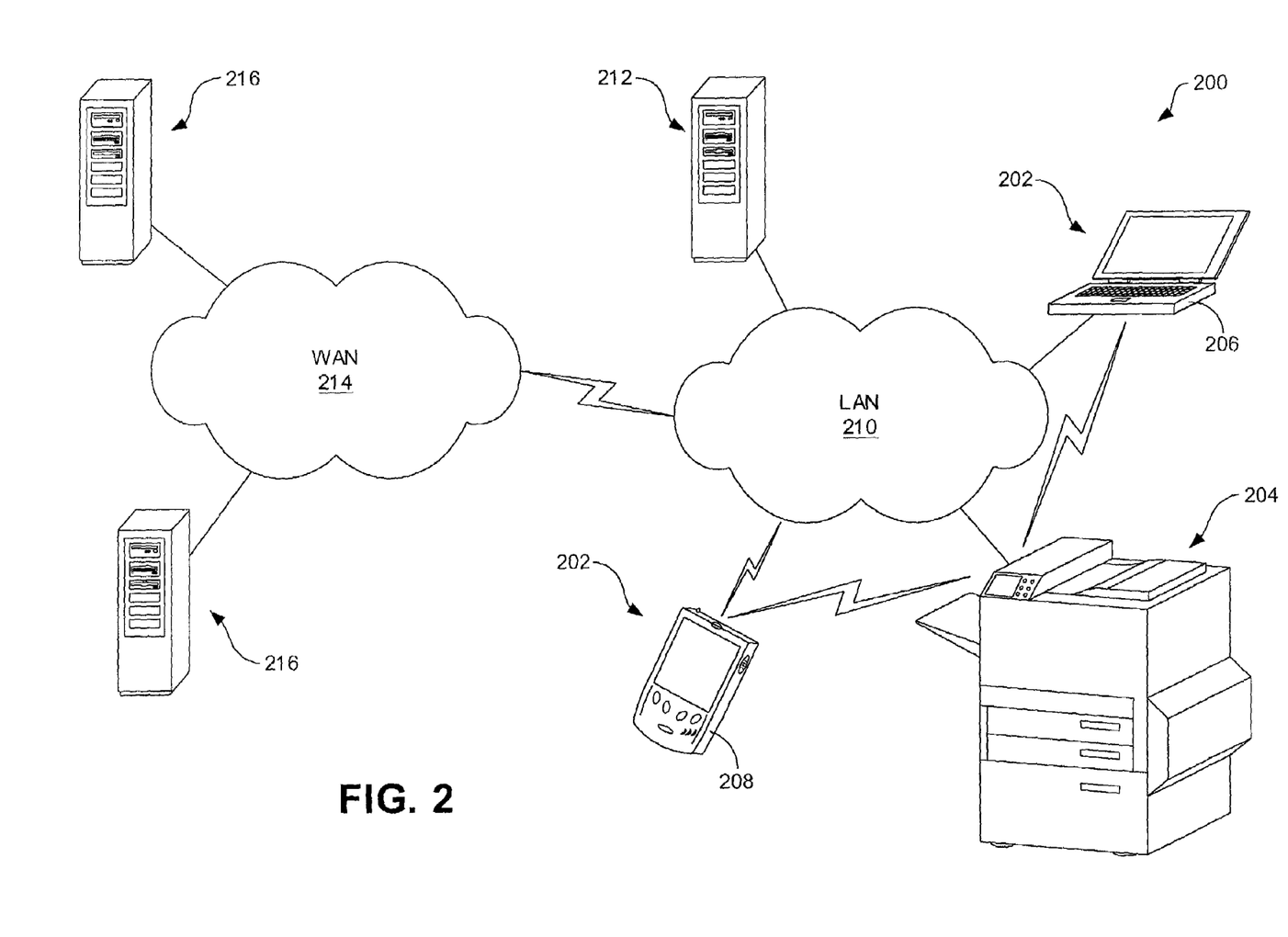
FIG. 2 is a schematic view of an example network-based system for facilitating printing to a local printing device.

FIG. 2 illustrates an example network-based system 200 that facilitates printing to a local printing device. As indicated in FIG. 2, the system 200 can comprise one or more portable computing devices 202 and a local printing device 204 that a user may wish to access. In the example arrangement shown in FIG. 2, the portable computing devices 202 can comprise a notebook computer 206 and a PDA 208. However, it is to be understood that the portable computing devices 202 can comprise substantially any portable computing device. As indicated in the figure, the printing device 204 can, for example, comprise a printer. Although a printer is shown in FIG. 2 and explicitly identified herein, it will be appreciated that the printing device 204 can comprise substantially any device that is capable of receiving print data and generating hard copy documents from the data including, for example, a multifunction peripheral (MFP), an all-in-one device, and the like.

The computing devices 202 and the printing device 204 are connected to a local area network (LAN) 210. These connections can comprise direct, i.e., wired, connections or wireless connections. In the former case, connectivity may be facilitated through a hard-wired network using a protocol such as Ethernet, or through a shared system such as a telephone and/or powerline network. In the wireless context, connectivity may be facilitated with a wireless networking protocol such as Bluetooth™ from Bluetooth SIG™ or 802.11 protocol from the Institute of Electrical and Electronics Engineers (IEEE). As will be appreciated from the discussion that follows, the precise configuration and protocol used to form the LAN 210 are not critical.

In addition to the computing devices 202 and the printing device 204, also shown connected to the LAN 210 is a network server 212. As is described in greater detail below, the network server 212 may support a printing service that is used to provide information to the computing devices 202 needed to establish a print path to the printing device. In addition, the server 212 may, in addition or exception, store various code (e.g., software) that can be shared with the computing devices 202 to facilitate printing to the printing device 204. Although only one such server is shown in FIG. 2, it will be appreciated that two or more servers could be connected to the LAN 210.

The LAN 210 is in communication with a wide area network (WAN) 214 that, for instance, may comprise part of the Internet. Connected to the WAN 214 are network (e.g., web) servers 216. As described below, the network servers 216 can, like server 212, support a printing service that facilitates printing from the computing devices 202 to the printing device 204 and/or comprise code that can be provided to the computing devices 202. Although two such servers 216 are depicted, it will be understood that these servers are representative of the many servers that may be accessible over the WAN 214.

Figure 3:
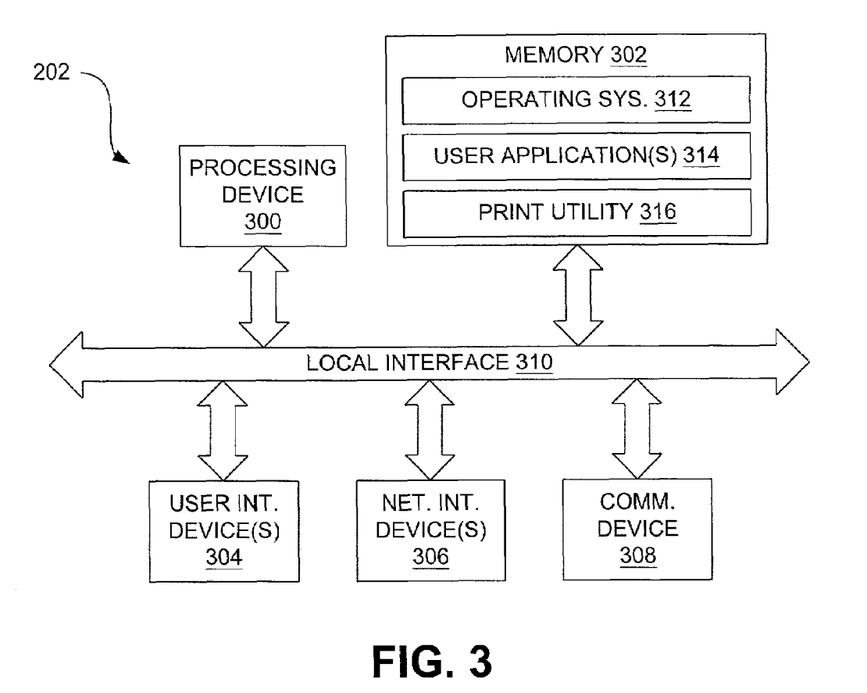
FIG. 3 is a block diagram of a portable computing device shown in FIG. 2.

FIG. 3 is a block diagram of an example architecture for the computing devices 202 shown in FIG. 2. As indicated in FIG. 3, each computing device 202 can, for instance, comprise a processing device 300, memory 302, one or more user interface devices 304, one or more network interface devices 306, and a communication device 308, each of which is connected to a local interface 310 that can comprise one or more internal and/or external buses. The processing device 300 can include any custom made or commercially available processor, a central processing unit (CPU) or an auxiliary processor among several processors associated with the computing device 202, a semiconductor based microprocessor (in the form of a microchip), or a macroprocessor. The memory 302 can include any one of a combination of volatile memory elements (e.g., RAM, such as DRAM, SRAM, etc.) and nonvolatile memory elements (e.g., ROM, hard disk, tape, CDROM, etc.).

The one or more user interface devices 304 comprise those components with which the user can interact with the computing device 202. By way of example, these components can comprise a keyboard and mouse, one or more buttons or function keys, a display, a stylus, etc. Where a display is provided, it may comprise, for instance, a computer monitor or a touch-sensitive liquid crystal display (LCD).

The network interface devices 306 comprise the various components used to transmit and/or receive data over a network (e.g., LAN 210). By way of example, the network interface devices 306 include a device that can communicate both inputs and outputs, for instance, a network card, modulator/demodulator (e.g., modem), wireless (e.g., radio frequency (RF)) transceiver, a telephonic interface, a bridge, a router, etc.

The communication device 308 is configured to communicate directly (as opposed to via LAN 210) with the printing device 204. Normally, the communication device 308 comprises a wireless communication device with which communications can be established between the client and the printing device 204 when the client comes within a given distance of the printing device. Specifically, such communications may be automatically initiated when the client is proximate to the computing device 202, so as to convey a user's potential interest in using the printing device. As used herein, the terms "proximate" and "proximity" are used generically to convey physical closeness between the client and the printing device 204. Therefore, no specific distance limitations are intended through use of these terms. Example wireless communication devices include a radio frequency (RF) transponder or transceiver, an infrared (IR) transceiver, an electromagnetic transceiver, and the like.

Although identified as comprising part of the computing device 202, the communication device 308 can, alternatively, comprise a component that is separate from the computing device. For instance, where the communication device 308 is an RF transponder, the device could be integrated into a separate device that is carried or worn by the user. Moreover, the communication device 308 need not be a wireless communication device but may comprise another device that can be used to convey information to the printing device 204. For instance, the communication device 308 could comprise an identification card that includes a bar code or a magnetic strip that can be read by an appropriate reader of the printing device 204.

With further reference to FIG. 3, the memory 302 comprises an operating system 312, one or more user applications 314, and a print utility 316. The operating system 312 comprises the software that controls the general operation of the computing device 202. The user applications 314 comprise one or more programs from which the user may wish to print. By way of example, the applications 314 can comprise a word processing application, network browser, etc. The print utility 316 is configured to facilitate creation of a print path to the printing device 204 once its network address is known. By way of example, the print utility 316 can be configured as a print wizard with which the user can "add" printing devices as print destinations as well as install the various software components necessary to create and send print jobs to the printing devices.

Figure 4:
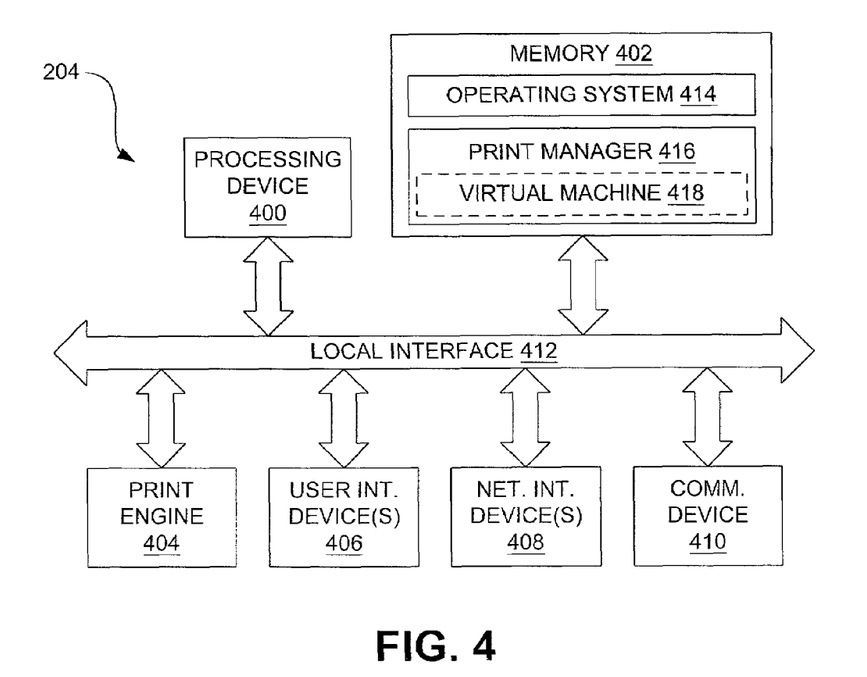
FIG. 4 is a block diagram of a printing device shown in FIG. 2.

FIG. 4 is a block diagram of an example architecture for the printing device 204 shown in FIG. 2. The printing device 204 can comprise a processing device 400, memory 402, a print engine 404, one or more user interface devices 406, one or more network interface devices 408, and a communication device 410, each of which is connected to a local interface 412. The processing device 400 can, like processing device 300, include any custom made or commercially available processor, a CPU or an auxiliary processor, a semiconductor based microprocessor or a macroprocessor. The memory 402 can, like memory 302, include any one of a combination of volatile memory elements and nonvolatile memory elements.

The print engine 404 comprises the various components that are used to apply toner or ink to a print medium, such as paper. The one or more user interface devices 406 comprise those components with which the user can interact with the printing device 204. By way of example, these components can comprise one or more buttons or function keys, a touch-sensitive screen, etc. The network interface devices 408 can be configured in similar manner to those identified above in relation to FIG. 3.

The communication device 410 is configured to communicate with the communication device 308 described above. Therefore, the configuration of the communication device 410 depends upon the configuration of the communication device 308. Accordingly, the communication device 410 may comprise an RF or IR, an electromagnetic transceiver, a card reader, etc.

The memory 402 comprises a basic operating system 414 that controls the general operation of the printing device 204 in receiving print data and generating hard copy documents from the received data. In addition to the operating system 414, the memory 402 includes a print manager 416 that is responsible for facilitating printing from a portable computing device 202 to the printing device 204. Specifically, the print manager 416 is configured to work in conjunction with the communication device 410 and its configuration may therefore depend upon the configuration of the communication device 410 and the nature of the communications had between the communication device 308 and the communication device 410. For instance, if communication between the computing device 202 and the printing device 204 is substantially one-sided with the communication device 308 merely providing client identification information to the printing device 204, the print manager 416 may be configured to provide data to a printing service that can provide the client with information it needs to create a print path to the printing device. In such a situation, the print manager 416 may include a virtual machine 418 that facilitates communication with the printing service.

In an alternative arrangement, where the communications are substantially two-sided and the communication device 308 and communication device 410 send and receive information back and forth between each other, the print manager 416 may be configured to facilitate the exchange this exchange of information.

Figure 5:
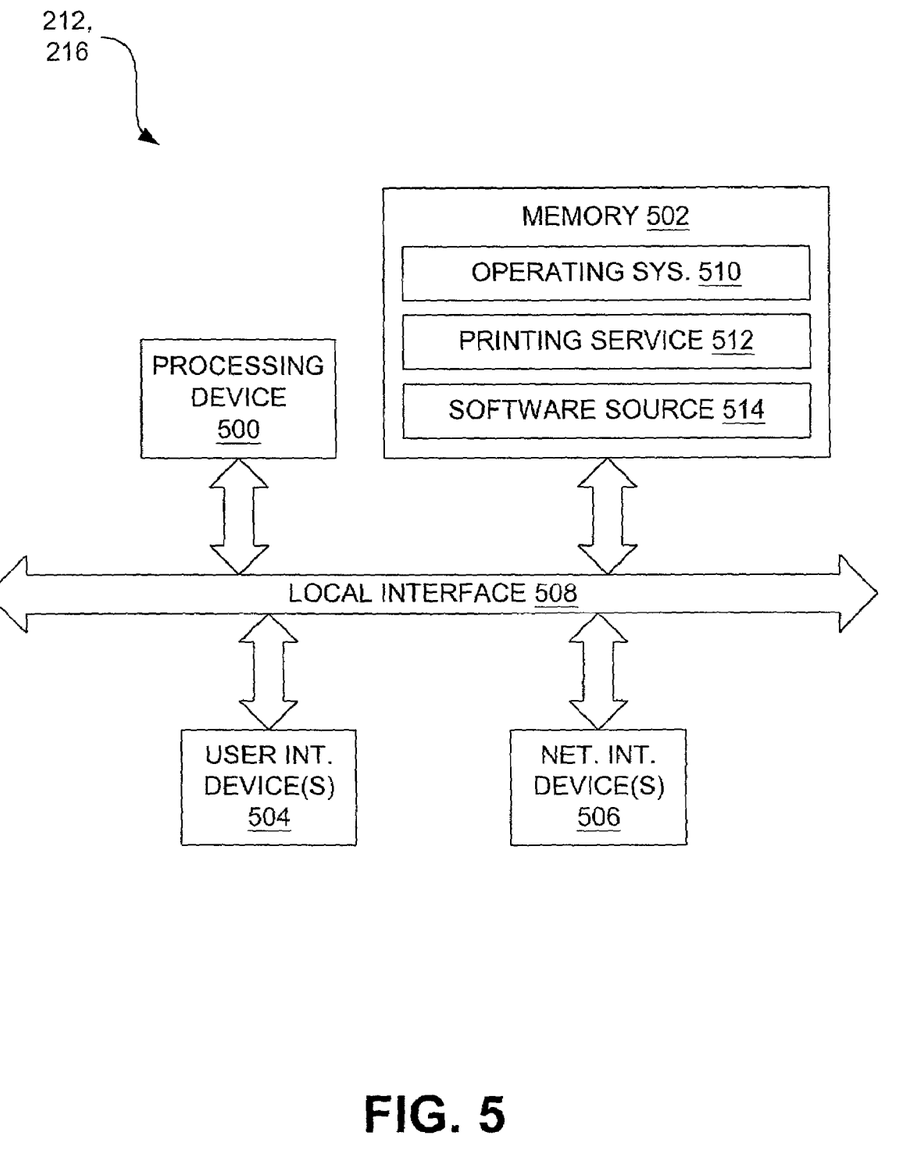
FIG. 5 is a block diagram of a network server shown in FIG. 2.

FIG. 5 is a block diagram of an example architecture for the network servers 212 and 216 shown in FIG. 2. As is apparent from FIG. 5, the network servers 212, 216 are similar in configuration to the computing devices 202 and therefore can comprise a processing device 500, memory 502 (including an operating system 510), user interface devices 504, network interface devices 506, and a local interface 508, each of which has a configuration similar to that of like-named components described above in relation to FIG. 3. However, as indicated in FIG. 5, the memory 502 can comprise a printing service 512 and/or a software source 514. As is described below, the printing service 512 can be configured to provide information about the printing device 204 to the computing devices 202 so that print paths to the printing device can be established. The software source 514 can be used by the computing devices 202, as needed, to obtain software required to create the print paths (e.g., driver software).

Various code (software and/or firmware) has been described herein. It is to be understood that this code can be stored on any computer readable-medium for use by or in connection with any computer-related system or method. In the context of this document, a computer-readable medium is an electronic, magnetic, optical, or other physical device or means that can contain or store a computer program for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. A "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, RAM, ROM, an erasable programmable read-only memory (EPROM, EEPROM, or flash memory), an optical fiber, and a portable compact disc read-only memory (CDROM). Note that the computer-readable medium could even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 6:
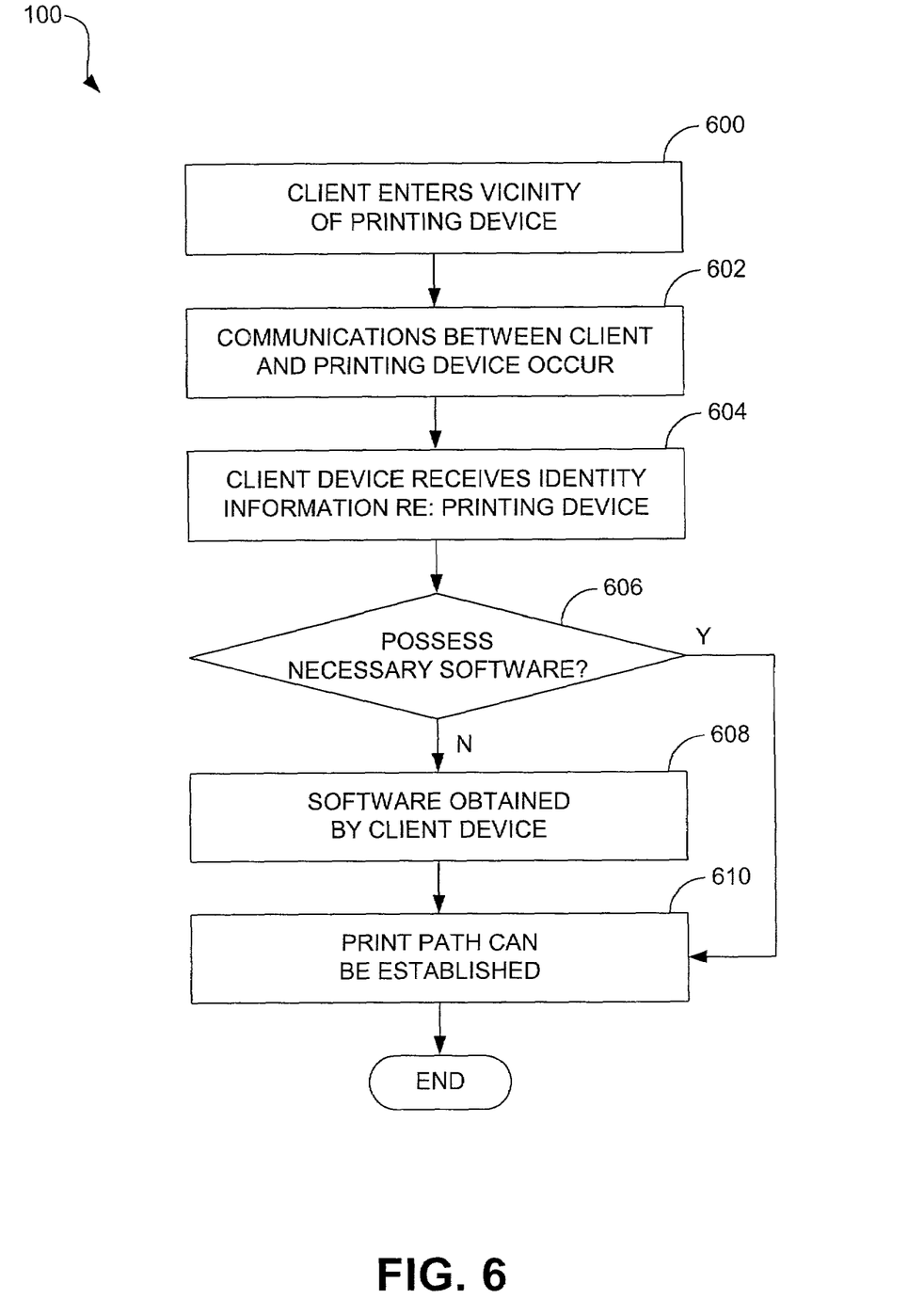
FIG. 6 is a flow diagram of a first example method for facilitating printing to a local printing device.

As identified above, it can be problematic to print to a local printing device that a mobile user encounters while moving from place to place. Specifically, a print path cannot be established with the printing device unless the user at least obtains the network address of the printing device. FIG. 6 provides an overview of one example method that facilitates such printing with reference to the system 100 shown in FIG. 1.

Beginning with block 600, a client 100 enters the vicinity of a printing device 104. As used herein, the term "vicinity" generically denotes a proximate area. Accordingly, no specific distance range is intended by use of the tern. Once the client 100 enters the printing device vicinity, communications between the client and the printing device 104 occur, as indicated in block 602. As is described below in greater detail, these communications can occur between a user computing device or a separate device associated with the user, and the printing device 104. Moreover, the nature of the communications may depend upon the communication scheme through which the client 102 and the printing device 104 communicate.

As a result of the communications that occur between the client 102 and the printing device 104, the client obtains identification information regarding the printing device, as indicated in block 604. This identification information typically comprises the network address of the printing device 104 and, optionally, information regarding the make, model, and/or configuration of the printing device. By way of example, this information can be provided by the printing service 106.

Once this information has been obtained by the client 102, it can be determined what else is needed to establish a print path to the printing device 104. For instance, it can be determined whether the client 102 possesses the software (e.g., driver software) needed to print to the printing device 104, as indicated in decision block 606.

If the client 102 does possess the software needed to print to the printing device 104, flow continues down to block 610 and the print path can be established. If, on the other hand, the software is not possessed by the client 102, flow continues to block 608 at which the client obtains this software from an appropriate source, for instance code source 108.

Figure 7A:
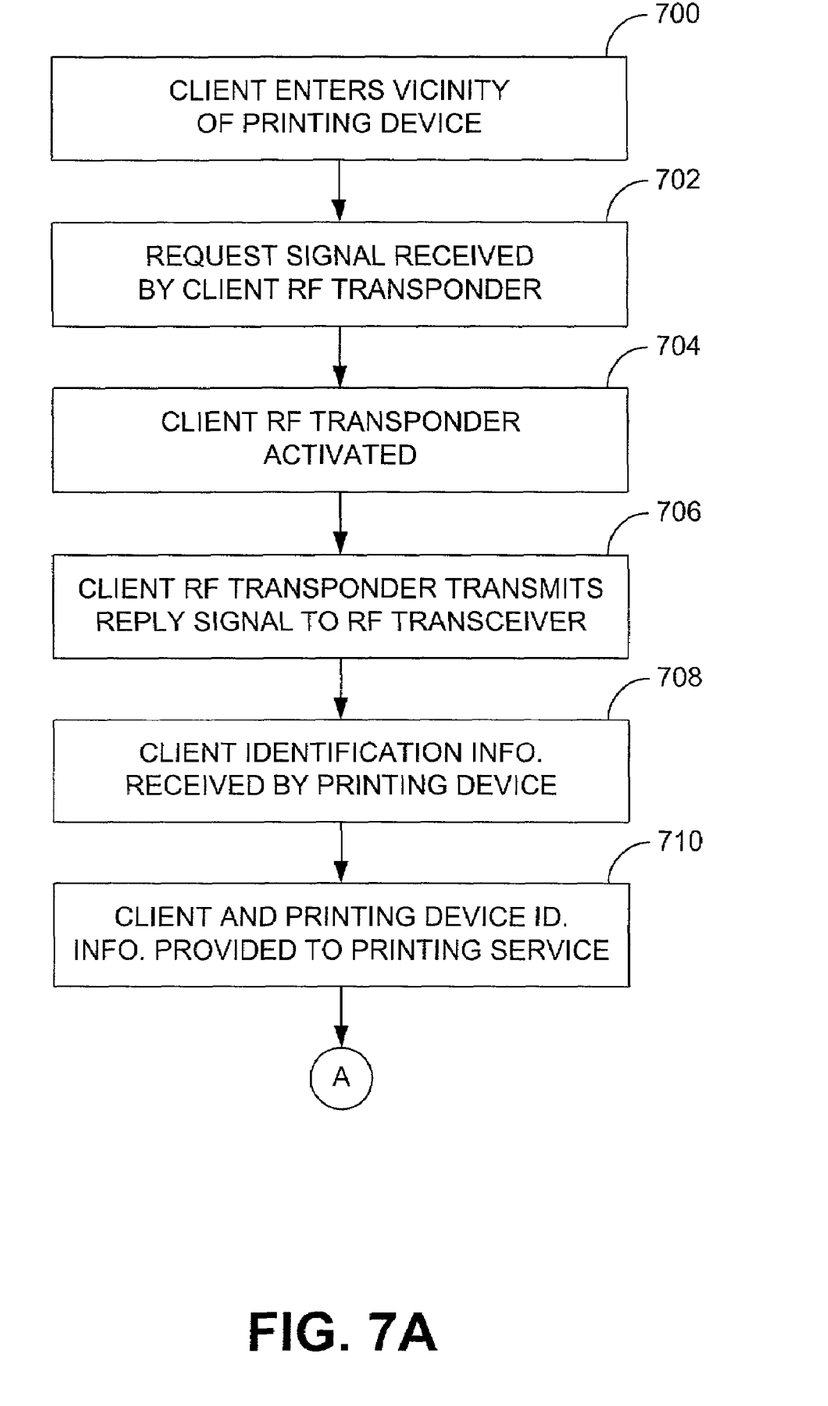
FIGS. 7A and 7B provide a flow diagram of a second example method for facilitating printing to a local printing device.
Figure 7B:
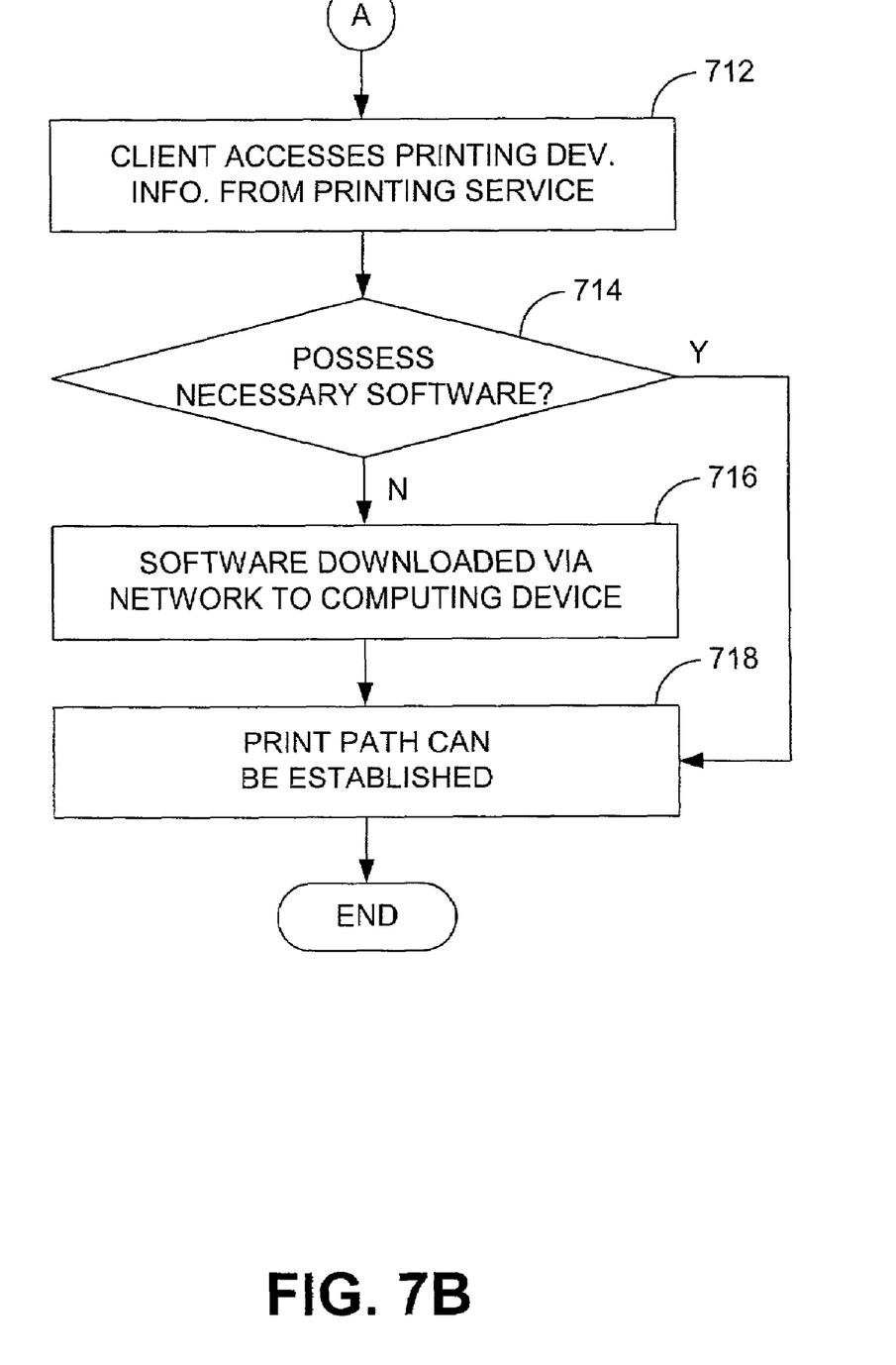

With reference now to FIGS. 7A and 7B, illustrated is another example method for facilitating printing to a local printing device. In this example, radio frequency transmission is used for communications between the client and the printing device. Specifically, a radio frequency identification (RFID) communication scheme is used in which the communication device (e.g., device 308) of the client comprises an RF transponder and the printing device communication device (e.g., device 410) comprises an RF transceiver. In this case, client identification information is provided to the printing device which forwards this information, along with identification information regarding the printing device, to a printing service that can be accessed by the client.

Beginning with block 700 in FIG. 7A, the client enters the vicinity of the printing device. The distance that defines the vicinity may vary depending upon the specific configuration of the communication devices (e.g., transponder and/or transceiver) used to facilitate communications between the client and the printing device. The printing device RF transceiver is used to continually (e.g., once every few seconds) transmit signals to any RF transponder in the vicinity of the printing device so that client presence can be detected. Once the client (i.e., the user and/or user computing device) has entered the printing device vicinity, one of these signals is received by the client RF transponder, as indicated in block 702. Upon receiving the transmitted signal from the RF transceiver, the normally passive RF transponder is activated (block 704) and transmits a reply signal back to the RF transceiver of the printing device, as indicated in block 706. This reply signal comprises identification information (i.e., an RFID) of the client and, optionally, computing device(s) used by the client.

The printing device and, more particularly the printing device print manager (e.g., manager 416), receives the client identification information, as indicated in block 708. At this point, the print manager can provide the client identification information, along with its own identification information (e.g., printing device network address, make, model, and configuration) to an appropriate printing service (e.g., service 512), as indicated in block 710. This printing service can be provided by a server (e.g., server 212) accessible over the LAN 210 or a server (e.g., server 216) accessible over the WAN 214. By way of example, the print manager 416 can use its virtual machine (e.g., machine 418), to transmit the identification information to the printing service via the network.

Once identification information has been provided to the printing service by the printing device, the client can access printing device information, including the network address of the printing device, from the printing service, as indicated in block 712 of FIG. 7B. For example, the client can access the printing service via a network to which the computing device is connected (e.g., LAN 210) using an appropriate network browser. Specifically, this information can be obtained by the client by providing the client identification information to the printing service that, in turn, matches this information with that provided by the printing device. Therefore, the printing service can determine which printing device to which the client is proximate.

At this point, as in the method of FIG. 6, it can be determined whether any software is still needed to print to the printing device, as indicated in decision block 714. Again, this determination can be made prior to printing by using an appropriate print utility (e.g., utility 316). In such a scenario, the user may have initiated an "add printing device" procedure. Alternatively, this determination can be made after a print command has been received. In another alternative, the determination can be made automatically upon receiving the printing device identification information as identified in reference to block 712. If the client does possess the software needed to print to the printing device 104, flow continues down to block 718 and the print path can be established. By way of example, this software may comprise a static driver that is specifically designed for use with the printing device, or a dynamic or generic driver that is configured to transmit print jobs to substantially any printing device.

If, on the other hand, the client does not possess the software needed to print to the printing device, flow continues to block 716 at which the software is downloaded via the network (e.g. LAN 210) to the user computing device. As noted above, this software may be obtained by any appropriate code source. For instance, the software may be obtained from a local server (e.g., server 212) or a remote server (e.g., server 216) that may or may not also support the printing service. To obtain this software, the computing device can transmit a software request signal that identifies the make, model, and configuration of the printing device obtained from the printing service to the code source in response to a command received during the "add printing device" procedure. Alternatively, such a request could automatically be transmitted by the print utility upon receiving the printing device identification information from the printing service if it is determined that the necessary software is not already possessed. In another alternative, the needed software can be automatically provided by the printing service along with the identification information if, from previously registered client computing device identification information, the printing service determines that the computing device lacks the software needed to print to the printing device.

Once the necessary software is resident in the computing device, the print path can be established and printing to the printing device can be had via the network. If is noted that the RFID scheme described above is relatively inexpensive for the user in that RF transponders are inexpensive. As will be appreciated by persons having ordinary skill in the art, other technologies would be equally, or even more, inexpensive to implement. For instance, instead of using an RFID scheme, a user identification card having a bar code or magnetic strip could be read by the printing device to provide the various client identification information to the print manager and, ultimately, the printing service. In such a scenario, the flow would be the same as described above in reference to blocks 708 through 718.

Figure 8:
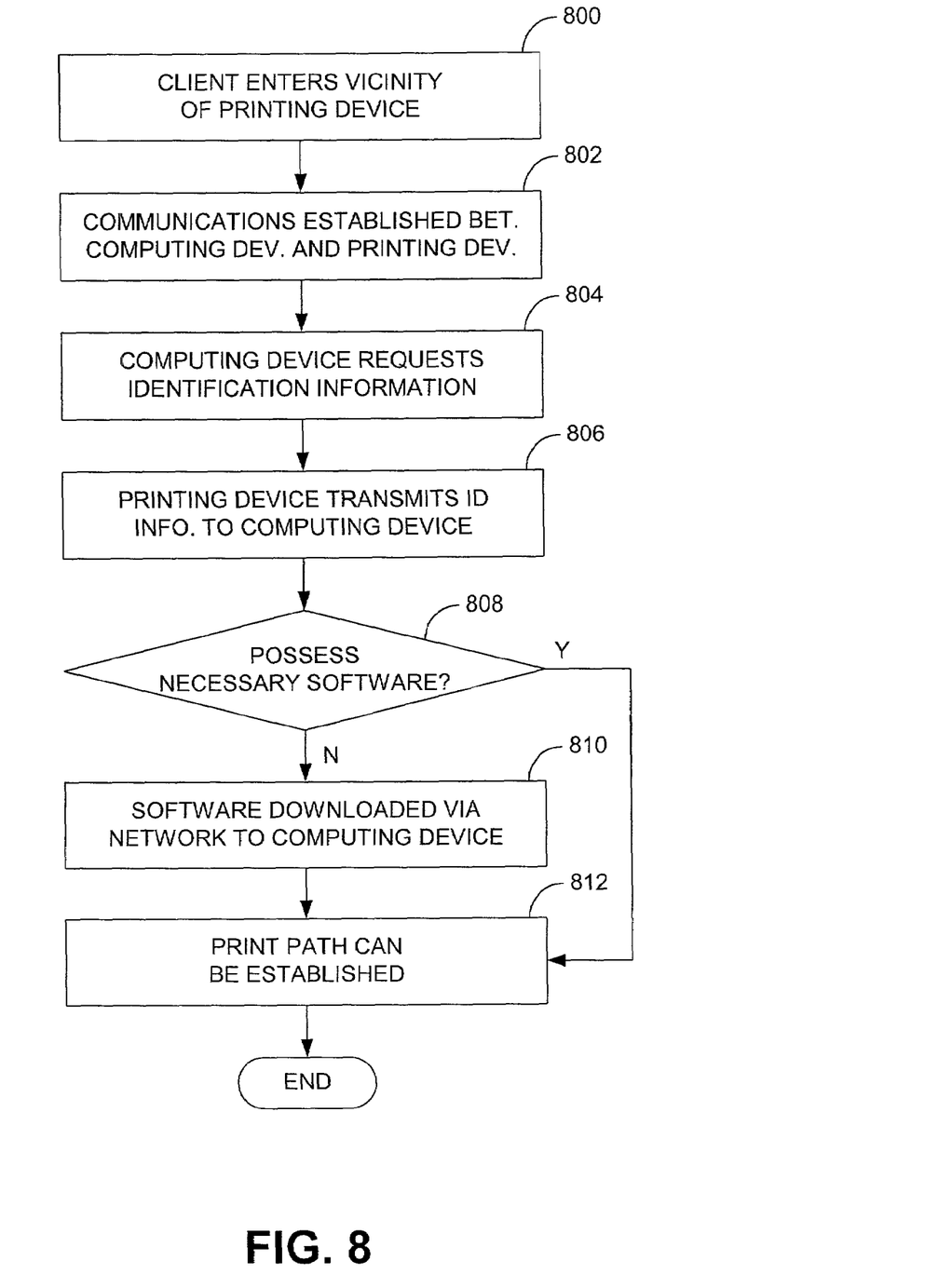
FIG. 8 is a flow diagram of a third example method for facilitating printing to a local printing device.

Turning now to FIG. 8, illustrated is a further example method for facilitating printing to a local printing device. In this example, the user computing device and the printing device communicate back and forth to exchange information. Due to this exchange, a separate printing service is not needed in that the information needed by the computing device to create the printing path, such as the printing device network address can be obtained from the printing device directly through the communications. By way of example, these communications can comprise direct communications facilitated by RF, IR, or electromagnetic transceivers, or communications through a wireless network using Bluetooth™ or 802.11 protocols.

Beginning with block 800 in FIG. 8, the client enters the vicinity of the printing device. Once the client has entered the printing device vicinity, communications can be established between the client computing device and the printing device, as indicated in block 802, either automatically due to the proximity between the computing device and the printing device, or in response to a initial communication transmitted by the communication device of the computing device under the command of the client.

Through these communications, the computing device can request identification information, such as its network address, from the printing device, as indicated in block 804. Upon receiving the request, the printing device, and more particularly the print manager (e.g., manager 416), transmits the identification information to the computing device, as indicated in block 806. Again, this information typically at least comprises a network address for the printing device and can, for instance, comprise information concerning the make, model, and configuration of the printing device.

With this information, a print path can be established with the printing device, assuming the computing device has the software it needs to send print jobs to the printing device. Therefore, at decision block 808, it is determined whether any software is needed to print to the printing device. If the computing device does possess the software needed to print to the printing device, flow continues down to block 812 and the print path can now be established. If, on the other hand, the computing device does not comprise the software needed to print to the printing device, flow continues to block 810 at which the software is downloaded via the network (e.g., LAN 210) to the computing device. Again, this software may be downloaded from a local or remote server. Once the necessary software is resident in the computing device, the print path can be established and printing to the printing device can be had via the network.

As will be apparent to persons having ordinary skill in the art, other communication schemes beyond those discussed above could be used to facilitate printing to the local printing device. For example, global position system (GPS) transponders could be provided for both the client and the printing device such that an appropriate printing service could determine the proximity between the client and the printing device and provide the client with the information needed to establish a print path to the printing device. Irrespective of the communication scheme used, however, clients can communicate with the local printing device to obtain the information, and software if necessary, that is required to print to the printing device. Accordingly, mobile users can print to substantially any printing device encountered if the printing device includes the communications functionality described herein.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for facilitating printing to a local printing device, comprising:
   directly communicating with the local printing device using a proximate portable computing device;
   receiving with the portable computing device a network address of the printing device as a result of the communicating with the local printing device so that a print path can be established between the portable computing device and the printing device; and
   sending a document to be printed from the portable computing device to the printing device along the established print path.

2. The method of claim 1, wherein communicating with the local printing device comprises wirelessly communicating with the printing device using the portable computing device.

3. The method of claim 1, wherein sending a document to be printed comprises wirelessly sending from the portable computing device the document directly to the printing device.

4. The method of claim 1, further comprising sending with the printing device client identification information received from the portable computing device and a network address of the printing device to a printing service that executes on a remote server.

5. The method of claim 4, wherein receiving the printing device network address comprises receiving with the portable computing device the printing device network address from the printing service.

6. The method of claim 1, wherein communicating with the local printing device comprises sending from the portable computing device directly to the printing device a request for the printing device network address.

7. The method of claim 6, wherein receiving the printing device network address comprises directly receiving with the portable computing device the printing device network address from the printing device.

8. The method of claim 1, further comprising receiving with the portable computing device driver software needed to print to the printing device.

9. The method of claim 8, wherein receiving driver software comprises receiving the driver software from a remote software source via a network.

10. The method of claim 9, wherein receiving a document to be printed comprises wirelessly receiving with the printing device the document from the portable computing device.

11. The method of claim 1, wherein communicating with the local printing device comprises receiving with the portable computing device a signal from the printing device requesting client identification information.

12. The method of claim 11, wherein communicating with the local printing device further comprises sending a reply signal from the portable computing device to the printing device that includes the client identification information.

13. The method of claim 12, wherein sending a reply signal comprises sending from the portable computing device to the printing device a radio frequency signal with a radio frequency transponder of the portable computing device.

14. The method of claim 13, wherein the signal comprises radio frequency ID (RFID) signal.

15. A method for facilitating printing to a local printing device, comprising:
- sending from the printing device to a proximate portable computing device a request for client identification information;
- receiving with the printing device client identification information sent from the portable computing device;
- sending from the printing device the received client identification information and a network address of the printing device to a remote printing service that is configured to provide the printing device network address to the portable computing device; and
- receiving with the printing device a document to be printed sent directly from the portable computing device.

16. The method of claim 15, wherein sending a request comprises transmitting a wireless request signal from the printing device to the portable computing device.

17. The method of claim 15, wherein sending a request comprises transmitting a radio frequency request signal via a radio frequency transceiver from the printing device to the portable computing device.

18. The method of claim 15, wherein receiving client identification information comprises receiving with the printing device a radio frequency ID (RFID) signal from a radio frequency transponder of the portable computing device.

19. The method of claim 15, wherein sending comprises transmitting the client identification information and the printing device network address from the printing device to a network-based printing service that executes on a remote server.

20. A method for facilitating printing to a local printing device, comprising:
- directly receiving with the printing device a request from a proximate portable computing device for a network address of the printing device;
- directly transmitting the printing device network address from the printing device to the portable computing device to enable establishing of a print path from the portable computing device to the printing device; and
- receiving with the printing device a document to be printed sent directly from the portable computing device along the established print path.

21. The method of claim 20, wherein receiving and transmitting are conducted wirelessly.

22. The method of claim 20, wherein receiving a document to be printed comprises wirelessly receiving with the printing device the document from the portable computing device.

23. A system for facilitating printing to a printing device, comprising:
- a portable computing device that includes a communication device;
- a printing device that includes a communication device that is configured for direct communication with the portable computing device's communication device so as to be capable of receiving client identification information sent from the portable computing device when it is near; and
- a print service that is configured to receive the client identification information and a network address of the printing device sent from the printing device and to send the network address to the portable computing device so as to enable the portable computing device to establish a print path between the portable computing device and the printing device such that a document to be printed can be directly sent from the portable computing device to the printing device along the established print path.

24. The system of claim 23, wherein the communication device of the portable computing device is a radio frequency transponder.

25. The system of claim 23, wherein the communication device of the printing device is a radio frequency transceiver.

26. The system of claim 23, wherein the printing service is a network-based service that executes on a remote server.

* * * * *